US012693919B2

(12) United States Patent
Szczepanik et al.

(10) Patent No.: US 12,693,919 B2
(45) Date of Patent: Jul. 28, 2026

(54) PREVENTION OF ERRONEOUS PERFORMANCE OF COMPUTER TASKS DEVIATING FROM A PATTERN IN A PATTERN LIBRARY

(71) Applicant: INTERNATIONAL BUSINESS MACHINES CORPORATION, Armonk, NY (US)

(72) Inventors: Grzegorz Piotr Szczepanik, Cracow (PL); Sakthivel Ruthrasekar, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 18/773,647

(22) Filed: Jul. 16, 2024

(65) Prior Publication Data

US 2026/0023630 A1     Jan. 22, 2026

(51) Int. Cl.
*G06F 11/30*     (2006.01)
*G06F 11/00*     (2006.01)

(52) U.S. Cl.
CPC ...... *G06F 11/004* (2013.01); *G06F 2201/805* (2013.01)

(58) Field of Classification Search
CPC .. G06F 11/004; G06F 11/302; G06F 11/0754; G06F 18/21; G06F 18/217;

(Continued)

(56) References Cited

U.S. PATENT DOCUMENTS 9,488,979  B1    11/2016  Chambers et al.
2007/0256050  A1   11/2007  Behnia
(Continued)

FOREIGN PATENT DOCUMENTS

IN    2500MUM2012  A    3/2014

OTHER PUBLICATIONS

Chotimongkol et al., Acquiring Domain-Specific Dialog Information from Task-Oriented Human-Human Interaction through an Unsupervised Learning, 2008 Conference on Empirical Methods in Natural Language Processing, Published Date: Jan. 2008, pp. 955-964.

(Continued)

*Primary Examiner* — Joseph O Schell
(74) *Attorney, Agent, or Firm* — CHIP LAW GROUP

(57)     ABSTRACT

A method, computer program product, and computer system for preventing erroneous performance of computer tasks. An iterative process of at least two iterations is performed. Each iteration includes: monitoring computer tasks performed on computing devices; ascertaining whether a deviant computer task having a deviation from one pattern of multiple pattens in a pattern library is about to be performed by any computing device and if so: sending an alert identifying the deviant computer task to the one computing device, receiving feedback to the alert from the one computing device, and updating a pattern score of the one pattern based on the feedback and replacing the pattern score of the one pattern in the pattern library with the updated pattern score. It is ascertained, in one iteration that is not the last iteration, that the deviant computer task is about to be performed.

20 Claims, 7 Drawing Sheets

(58) Field of Classification Search
CPC .......... G06F 18/22; G06F 18/40; G06F 21/50;
G06F 21/52; G06F 2201/805; G06N
3/084; G06N 3/092
See application file for complete search history.

(56) References Cited

U.S. PATENT DOCUMENTS

| | | | |
|---|---|---|---|
| 2015/0121381 A1 | 4/2015 | Chen | |
| 2016/0292028 A1* | 10/2016 | Gamage | G06F 9/542 |
| 2018/0225027 A1* | 8/2018 | Cooke | G06F 3/04842 |
| 2019/0095313 A1* | 3/2019 | Xu | G06F 18/24323 |
| 2019/0129788 A1* | 5/2019 | Fields | G06F 11/006 |
| 2019/0179692 A1* | 6/2019 | Udayaadithya | G06F 11/3476 |
| 2021/0157665 A1* | 5/2021 | Rallapalli | G06N 3/044 |
| 2021/0191726 A1* | 6/2021 | Tarango | G06F 18/24143 |
| 2022/0004563 A1* | 1/2022 | Ghosh | G06N 7/00 |
| 2023/0222143 A1 | 7/2023 | Ghosh | |
| 2024/0411880 A1* | 12/2024 | Grover | G06F 21/566 |
| 2024/0411881 A1* | 12/2024 | Aday | G06F 21/566 |

OTHER PUBLICATIONS

Brown, "Oops! Coping with Human Error in IT Systems: Errors Happen. How to Deal", Queue 2.8 (2004), pp. 34-41.

* cited by examiner

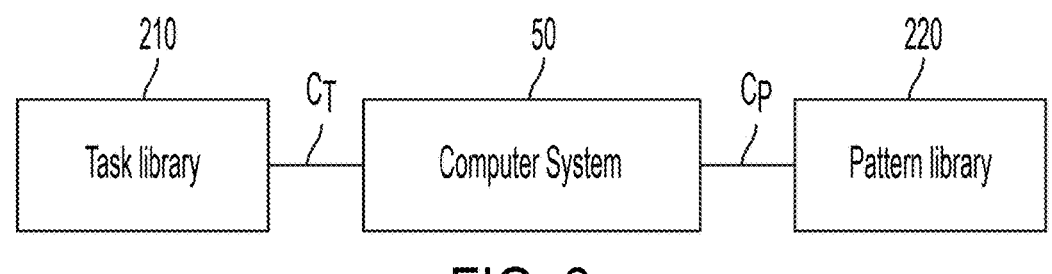

FIG. 2

| COMPUTER TASKS | | | |
|---|---|---|---|
| Actions | | Communications | |
| Data source 1 - CLI commands | | Data source A - Instant messaging | |
| Command | Metadata | Utterance | Metadata |
| *makefs.xfs /dev/sda1* | Timestamp User IP address Hostname | *Hi, Alice Please, make me a XFS FS this time* | Timestamp IP address Participants Tone |
| *rm -Rf /var/log/\** | | *Hi Bob, /var/log on cache kills performance, database is not working, clean this ASAP* | |
| *pvcreate /dev/sdx9* | | *I need new volume NOW!!* | |
| Data source 2 - WebGUI actions | | Data source B - Change requests | |
| Command | Metadata | Utterance | Metadata |
| Button Sync clicked | Timestamp User IP address Browser/OS Endpoint | *Go on the link https://panel1.example, find a machine Bravo01 and click Sync button* | Timestamp IP address Participants SSL certificates Tone |
| Button Stop clicked on Tile XE on https://dev-panel.example | | *Stop machine XE using DEV PANEL* | |
| Icon <X> clicked on https://firewalld.example | | *Turn off firewall* | |

FIG. 3

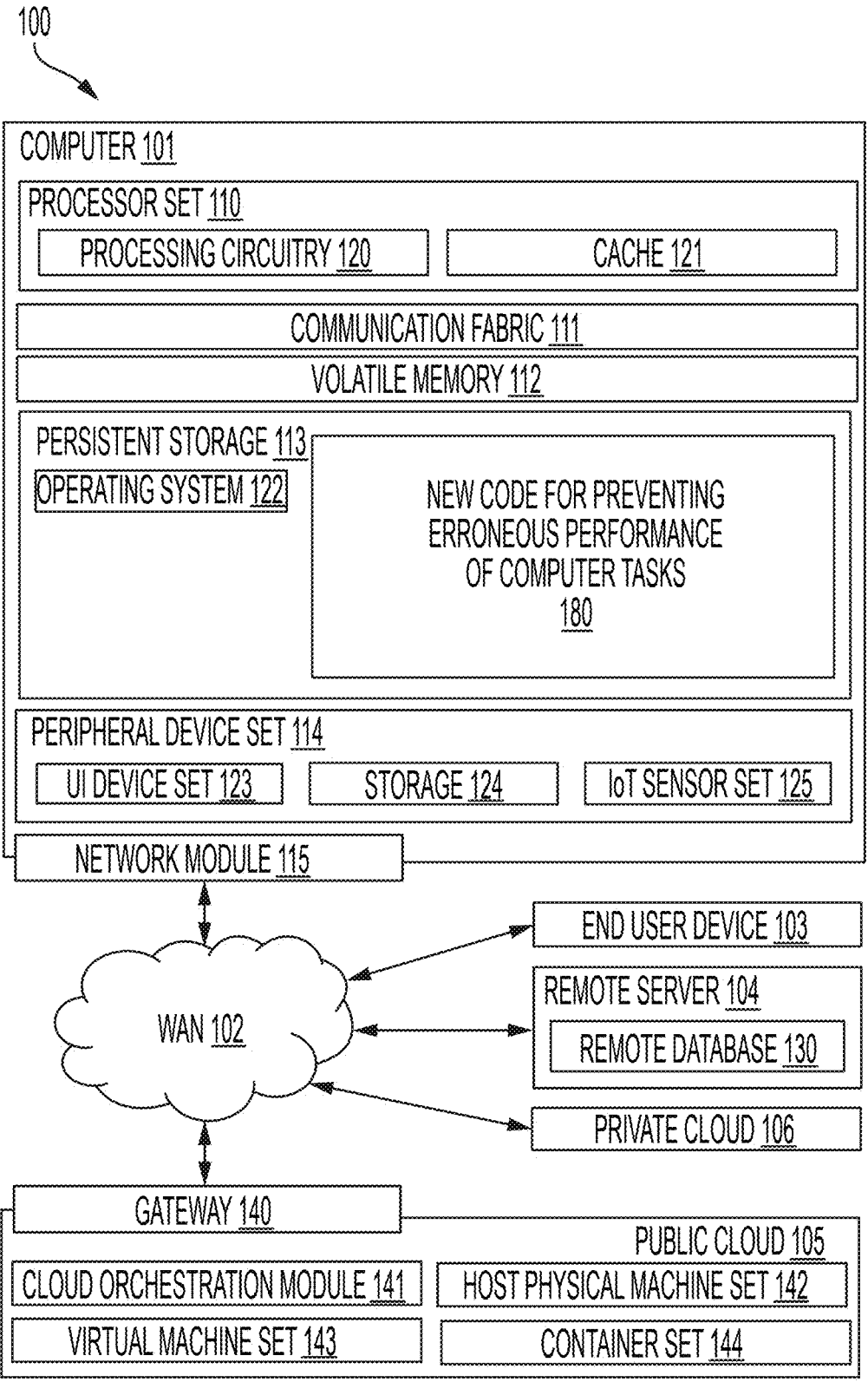

100

COMPUTER 101

PROCESSOR SET 110

PROCESSING CIRCUITRY 120　　　　　CACHE 121

COMMUNICATION FABRIC 111

VOLATILE MEMORY 112

PERSISTENT STORAGE 113

OPERATING SYSTEM 122

NEW CODE FOR PREVENTING
ERRONEOUS PERFORMANCE
OF COMPUTER TASKS
180

PERIPHERAL DEVICE SET 114

UI DEVICE SET 123　　　STORAGE 124　　　IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141　　HOST PHYSICAL MACHINE SET 142

VIRTUAL MACHINE SET 143　　　CONTAINER SET 144

FIG. 8

PREVENTION OF ERRONEOUS PERFORMANCE OF COMPUTER TASKS DEVIATING FROM A PATTERN IN A PATTERN LIBRARY

BACKGROUND

The present invention relates generally to performance of computer tasks, and more specifically, to prevention of erroneous task performance of computer tasks.

SUMMARY

Embodiments of the present invention provide a method, a computer program product, and a computer system, for preventing erroneous performance of computer tasks.

One or more processors of a computer system perform an iterative process of at least two iterations.

Each iteration of the iterative process includes: monitoring computer tasks performed on one or more computing devices used by one or more respective users, each computer task characterized by a command and metadata, the command being an operation and at least one operand of the operation; ascertaining, from the monitoring, whether a deviant computer task having a deviation from one pattern of multiple patterns in a pattern library is about to be performed by any computing device of the one or more computing devices, each pattern in the pattern library having a pattern score exceeding a specified pattern score threshold and being a pattern of computer tasks in a task library having a same meta-command consisting of the command and a subset of the metadata; if the ascertaining ascertains that the deviant computer task is about to be performed by one computing device used by a respective user, then: (i) sending an alert identifying the deviation to the one computing device; (ii) receiving from the one computing device feedback to the alert; and (iii) updating the pattern score of the one pattern based on the feedback and replacing the pattern score of the one pattern in the pattern library with the updated pattern score; and determining whether a last iteration of the iterative process has been performed, and if so then terminating the iterative process, and if not then branching back to the monitoring to perform a next iteration of the iterative process.

The ascertaining ascertains, in one iteration that is not the last iteration, that the deviant computer task is about to be performed.

BRIEF DESCRIPTION OF THE DRAWINGS

FIG. 2 depicts the computer system of FIG. 1 being connected to a task library and a pattern library, in accordance with embodiments of the present invention.

FIG. 3 is a task chart illustrating exemplary computer tasks that may be stored in the task library of FIG. 2, in accordance with embodiments of the present invention.

FIG. 8 depicts a computing environment which contains an example of an environment for the execution of at least some of the computer code involved in performing the inventive methods, in accordance with embodiments of the present invention.

DETAILED DESCRIPTION

Users who perform computer tasks are prone to error due such factors as inattention, boredom, distraction, tiredness, etc.

Embodiments of the present invention prevent such erroneous performance of computer tasks.

A computer task is defined as a task that is performed on a computing device.

Figure 1A:
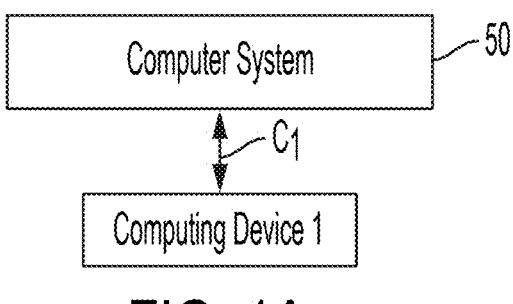
FIGS. 1A, 1B, 1C depict a computer configuration comprising a computer system and N computing devices, in accordance with embodiments of the present invention.
Figure 1B:
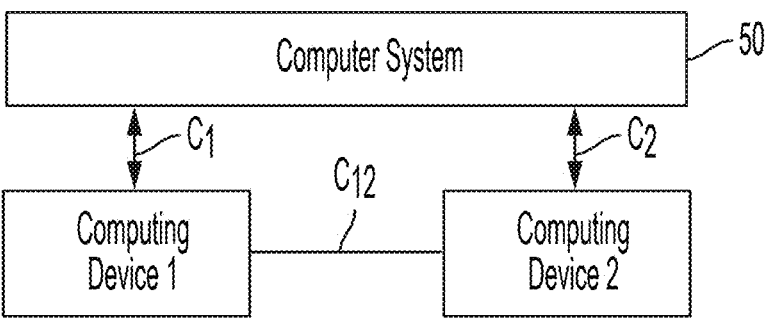
Figure 1C:
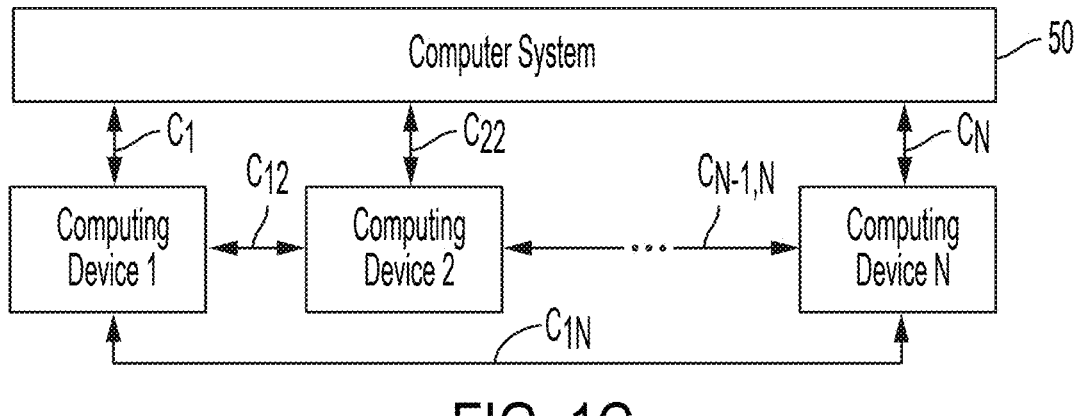
Figure 7:
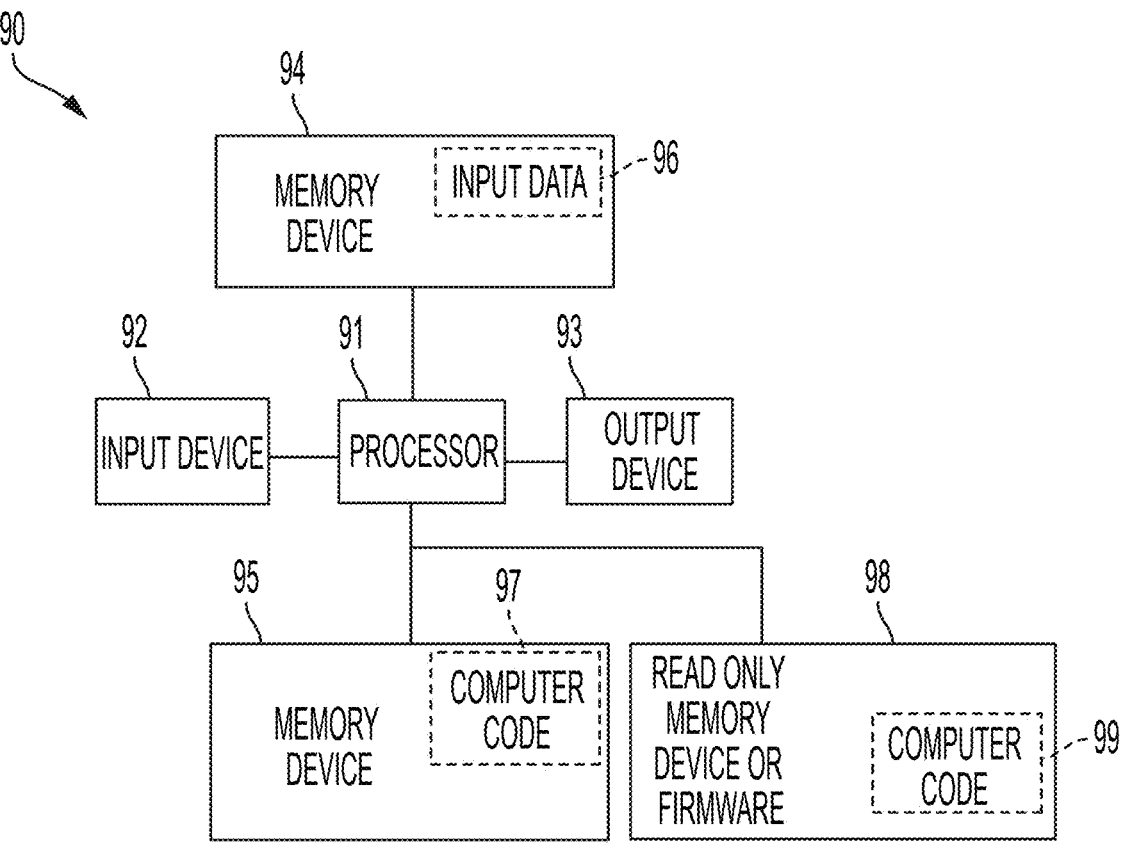
FIG. 7 illustrates a computer system, in accordance with embodiments of the present invention.

A computing device is defined as a device that includes a processor configured to perform computation and logic and may be any of the following devices: a stand-alone computer, a computer within a computer system such as, inter alia, the computer system of 90 of FIG. 7 or the computer environment 100 of FIG. 8; a hand-held computer (e.g., a palmtop computers, a personal digital assistant (PDA), a smartphone, a tablet, etc.); a special-purpose computer designed specifically to implement embodiments of the present invention (e.g., a computing device containing an application specific integrated circuit (ASIC)), etc., FIGS. 1A, 1B, 1C depict a computer configuration comprising a computer system 50 and N computing devices, in accordance with embodiments of the present invention. Each computing device of the N computing devices is used by a respective user.

The computer system 50 is a computer system such as, inter alia, the computer system of 90 of FIG. 7 or the computer environment 100 of FIG. 8.

Generally, N is at least 1. In FIG. 1A, N=1. In FIG. 1B, N=2. In FIG. 1C, N≥3.

$C_n$ denotes a wired or wireless connection between the computer system 50 and computing device n (n=1, . . . , N). For example, $C_1$ denotes a wired or wireless connection between the computer system 50 and computing device 1.

$C_{nm}$ denotes a wired or wireless connection between computing device n and computing device m (n=1, . . . , N; m=1, . . . , N; n≠m). For example, $C_{12}$ denotes a wired or wireless connection between computing device 1 and computing device 2.

FIG. 2 depicts the computer system 50 of FIG. 1 being connected to a task library 210 and a pattern library 220, in accordance with embodiments of the present invention.

The task library 210 and the pattern library 220 are databases stored on one or more computer readable hardware storage devices.

$C_T$ denotes a wired or wireless connection between the computer system 50 and the task library 210. $C_P$ denotes a wired or wireless connection between the computer system 50 and the pattern library 220.

Although FIG. 2 depicts the task library 210 and the pattern library 220 being external to the computer system 50, the task library 210 and/or the pattern library 220 may alternatively be disposed within the computer system 50 in one embodiment.

The task library 210 comprises computer tasks previously performed by users on respective computing devices. FIG.

Figure 5:
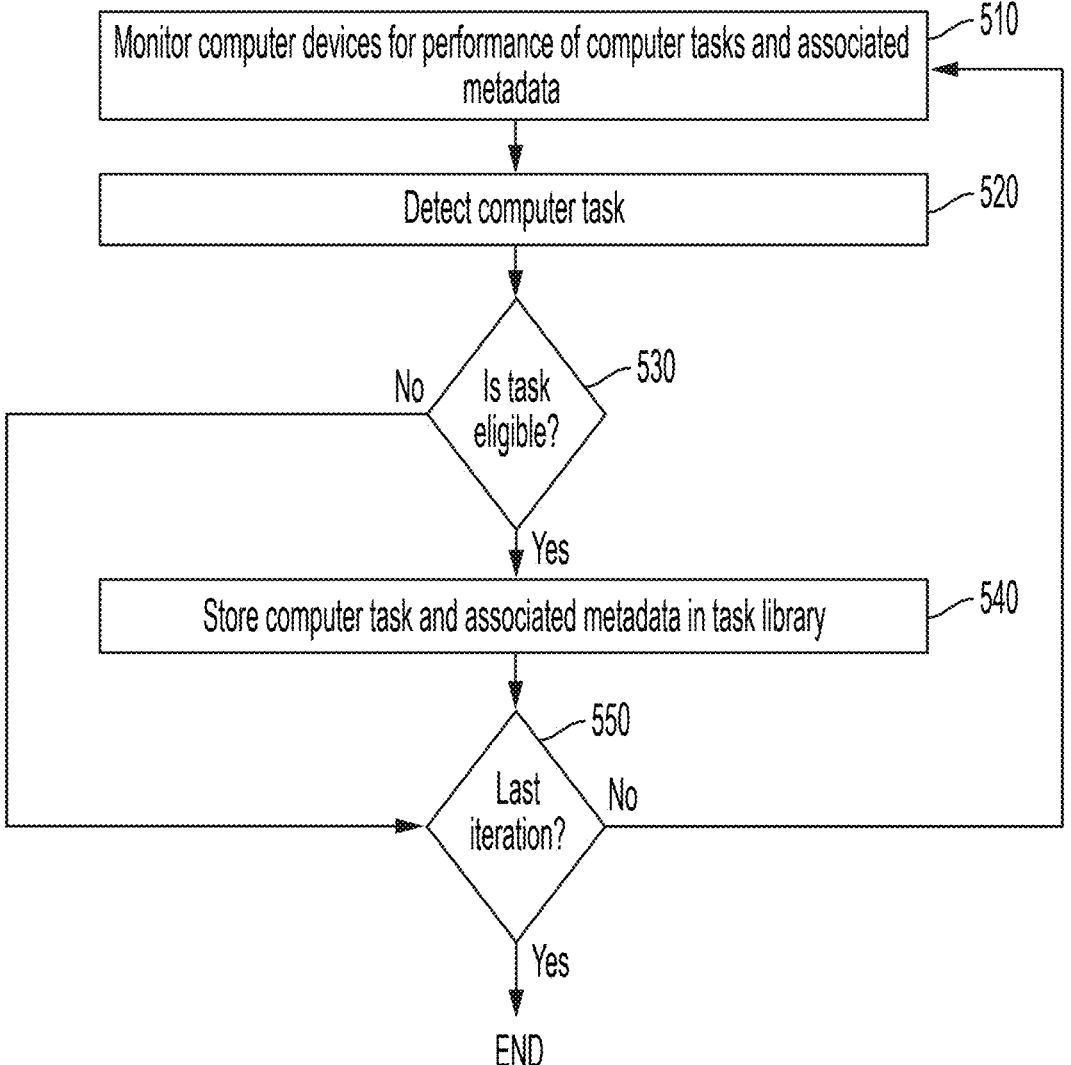
FIG. 5 is a flowchart of a process for generating the task library of FIG. 2, in accordance with embodiments of the present invention.

3, described infra, illustrates exemplary computer tasks that may be stored in the task library 210. FIG. 5, described infra, provides embodiments of a process for generating the task library 210.

Figure 6:
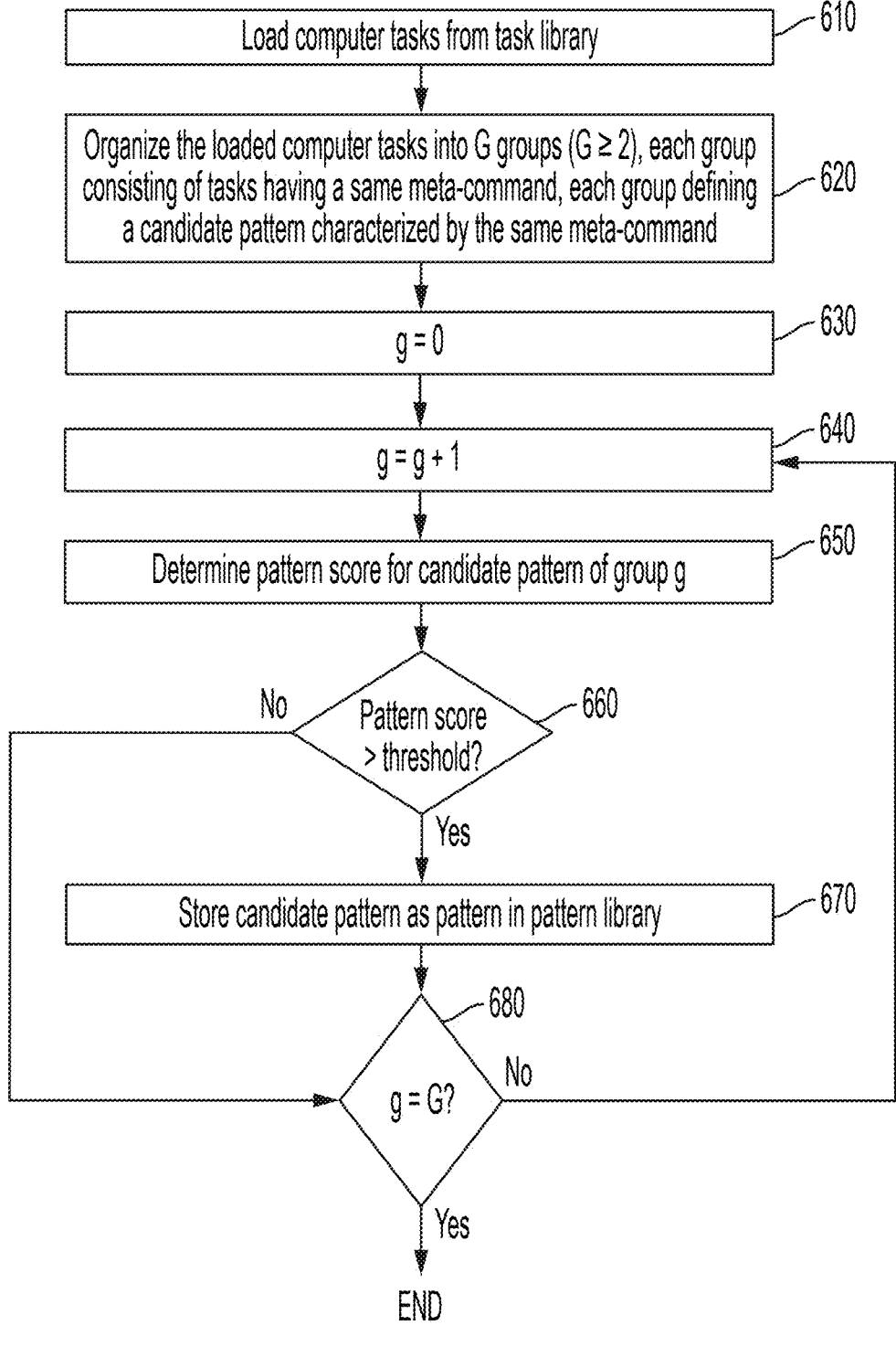
FIG. 6 is a flowchart of a process for generating the pattern library of FIG. 2, in accordance with embodiments of the present invention.

The pattern library 220 comprises patterns and an associated pattern scores of computer tasks stored in the task library. FIG. 6, described infra, provides embodiments of a process for generating the pattern library 220.

FIG. 3 is a task chart illustrating exemplary computer tasks that may be stored in the task library 210 of FIG. 2, in accordance with embodiments of the present invention. Each computer task is characterized by a command and metadata. Each command is characterized by an operation and at least one operand. An operand of an operation is defined as an entity that is acted upon, or is an object of, the operation.

The computer tasks in FIG. 3 are actions 310 and communications 320.

The actions 310 are metadata and software commands from data source 1 (CLI commands), and metadata and hardware commands from data source 2 (WebGUI actions). For example, the software command "makefs.xfs/dev/sda1" includes the operation "makefs" (create file system) and the operand "xfs" where xfs is the file system to be created. For example, the hardware command "Button Sync clicked" includes the operation of click button and the operand pertaining to the button clicked is Synch (e.g., synch settings).

The communications 320 are metadata and utterance commands from data source A (instant messaging), and metadata and utterance commands from data source B (change requests). Each utterance command is a communication requesting performance of an action comprising an operation and an associated at least one operand. For example, the utterance command "Turn off firewall" is a communication requesting performance of the operation "turn off" for the operand "firewall" identifying a firewall to be turned off.

Although FIG. 3 shows, for simplicity, the same metadata for all exemplary computer tasks of each data source, in general, the metadata is specific to each computer task.

A pattern that is a candidate pattern for being stored in the pattern library is a pattern exhibited by a plurality of computer tasks having a same meta-command. A meta-command of a computer task consists of the command and a subset of the metadata of the computer task. For example with reference to FIG. 3, a meta-command is the command "makefs.xfs/dev/sda1" and metadata "IP address". Another meta-command is "makefs.xfs/dev/sda1" and metadata "IP address" and "User".

In one embodiment, a subset of the metadata of the computer task is null subset, so that the meta-command is the command of the computer task and no metadata.

Each pattern and candidate pattern has an associated pattern score. A necessary condition for a candidate pattern to be stored as a pattern in the pattern library 220 is that the pattern score must exceed a specified pattern score threshold. For example, if the specified pattern score threshold is 0.80 and the pattern score is 0.95, then the preceding necessary condition is satisfied.

In one embodiment, another necessary condition for candidate pattern to be stored as a pattern in the pattern library 220 is that the number of computer tasks of the plurality of computer tasks of the candidate pattern stored in the task library 210 exceeds a specified number of computer tasks threshold.

For example, if the specified number of computer tasks threshold is 25 and the pattern score exceeds the specified pattern score threshold, then a candidate pattern for 23 computer tasks is not stored in the in the pattern library 220, and a candidate pattern for 29 computer tasks is stored in the in the pattern library 220.

In one embodiment, the pattern score is based at least in part on a ratio of a number of occurrences of the same meta-command ($N_m$) to a number of occurrences of all computer tasks having the operation comprised by the same meta-command ($N_{all}$).

For example, if the meta-command "makefs.xfs" with metadata "IP address" and "User" occurs 85 times in computer tasks in the task library 210, and there are 15 occurrences of the operation "makefs.ext4" for all combinations of metadata tasks in computer tasks of the task library 210 and there are no other occurrences of the operation "makefs" in computer tasks of the task library 210, then $N_m$=85 and $N_{all}$=85+15=100 and the pattern score is $^{85}/_{100}$=0.85.

Figure 4:
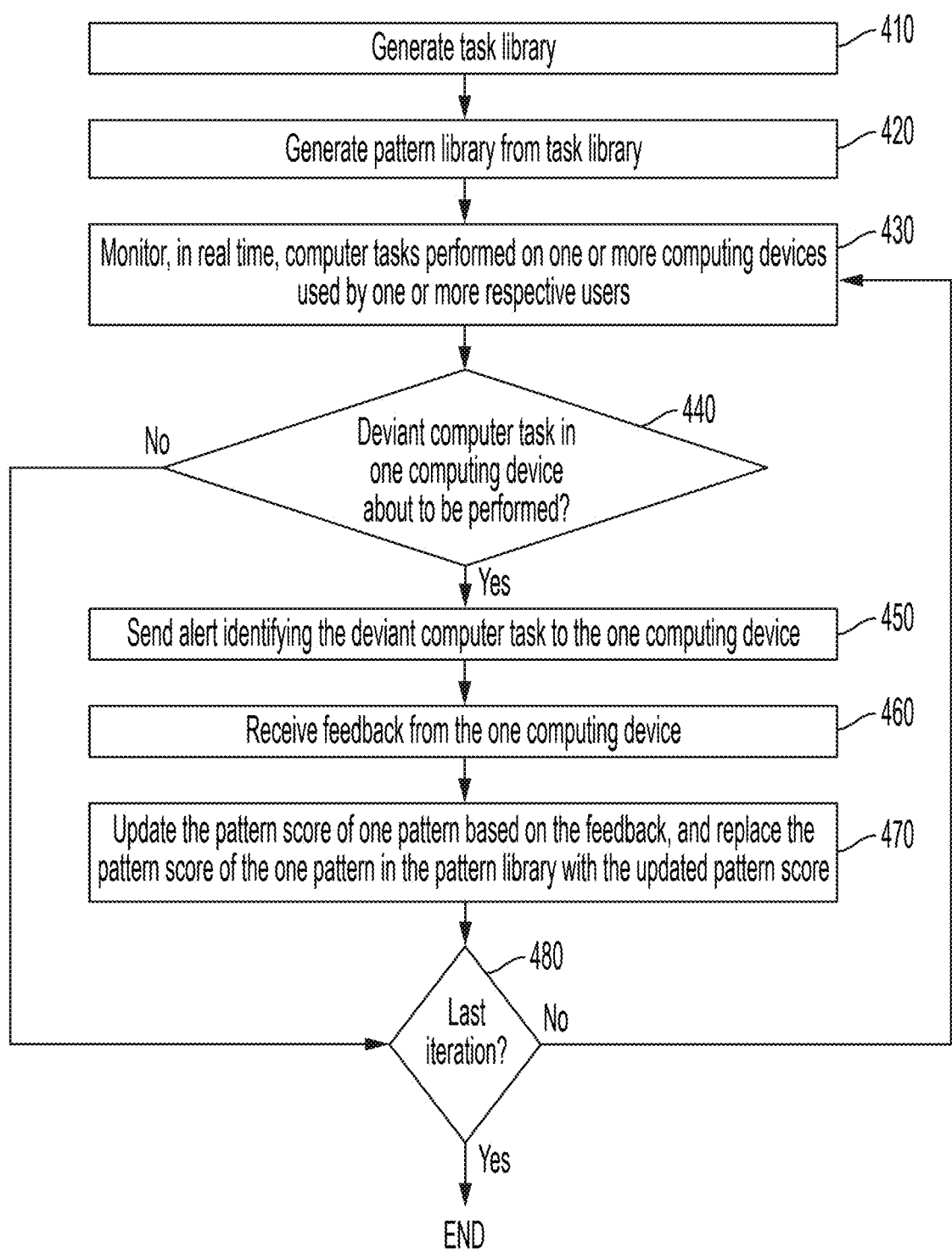
FIG. 4 is a flow chart of a method for preventing erroneous performance of computer tasks, in accordance with embodiments of the present invention.

FIG. 4 is a flow chart of a method for preventing erroneous performance of computer tasks, in accordance with embodiments of the present invention. The flow chart of FIG. 4 includes steps 410-480.

Step 410 generates the task library 210 of FIG. 2. The task library 210 comprises computer tasks previously performed by users on respective computing devices. FIG. 5, described infra, provides embodiments of a process for generating the task library 210.

Step 420 generates the pattern library 220 of FIG. 2. The pattern library 220 comprises patterns and associated pattern scores of computer tasks stored in the task library 210. Each pattern in the pattern library 220 is a pattern exhibited by a plurality of computer tasks in the task library 210 having a same meta-command consisting of the command and a subset of the metadata. Each pattern in the pattern library 220 has a pattern score exceeding a specified pattern score threshold. The pattern score of each pattern is a ratio of a number of occurrences in the task library of the same meta-command to a number of occurrences in the task library of all computer tasks having the operation comprised by the same meta-command.

Steps 430-480 perform each iteration of an iterative process of at least two iterations.

Step 430 monitors, in real time, computer tasks performed on one or more computing devices used by one or more respective users.

Step 440 ascertains, from the monitoring in step 430, whether a deviant computer task having a deviation from one pattern in the pattern library is about to be performed by any computing device of the one or more computing devices.

The deviant computer task has the same operation as the operation in the meta-command of the one pattern and deviates from the at least one operand and/or the subset of the metadata of the meta-command of the one pattern. For example, if the meta-command of the one pattern is "makefs.xfs/dev/sda1" and metadata "IP address", the deviant computer task of "makefs.exte/dev/sda1" and metadata "IP address" has a same operation of "makefs" as the one pattern and deviates from the one pattern in the at least one operand since "ext4" deviates from "xfs".

In one embodiment, the subset of the metadata in the one pattern is a null subset.

If step 440 ascertains that that the deviant computer task is about to be performed by one computing device used by a respective user (Yes branch from step 440), then step 450 is next executed; otherwise (No branch from step 440), step 480 is next executed.

Step 450 sends an alert identifying the deviant computer task to the one computing device. In one embodiment, the alert is a visual alert (e.g., a popup, a message, a color or color change such as from red to green), an audio alert (e.g., a sound, a voice communication), or a combination thereof.

Step 460 receives, from the one computing device, feedback comprising whether the one computing device will perform the deviant computer task or will perform a computer task associated with the one pattern. The feedback is that the one computing device will perform the deviant computer task or will perform a computer task associated with the one pattern.

Step 470 updates the pattern score of the one pattern based on the feedback and replaces the pattern score of the one pattern in the patten library with the updated pattern score.

If the feedback is that the one computing device will perform a computer task associated with the one pattern, then the computer task associated with the one pattern is added to the one pattern and the pattern score of the one pattern is updated by being recomputed based on the one pattern comprising the added computer task.

If the feedback is that the one computing device will perform the deviant computer task, then in one embodiment the one pattern is considered to be weakened and accordingly the pattern score of the one pattern is updated by being decremented by a decrement value or decrement percent.

In one embodiment, the decrement value or decrement percent is a specified constant.

In one embodiment, the decrement value or decrement percent is specific to whether each computer task of the one pattern is an action or a communication.

In one embodiment, the operation included in the same meta-command of the one pattern has an operation value specific to the included operation, and wherein the decrement value or decrement percent is a linear function of the operation value or a nonlinear function of the operation value.

In one embodiment, a determination is made that the decremented pattern score of the one pattern does not exceed the specified pattern score threshold and in response, the one pattern is deleted from the pattern library Step 480 determines whether the current iteration is a last iteration. If so (Yes branch from step 480), the method ends. If not (No branch from step 480), the method branches back to step 430 to perform the next iteration of the iterative process.

In one embodiment, step 480 determines that the current iteration is the last iteration because a specified total number of iterations have been performed.

In one embodiment, step 480 determines that the current iteration is the last iteration because the real-time monitoring of computer tasks in step 440 has been temporarily halted.

In one embodiment, step 440 ascertains, in one iteration that is not the last iteration, that the deviant computer task is about to be performed.

FIG. 5 is a flowchart of a process for generating the task library 210 of FIG. 2, in accordance with embodiments of the present invention. The flow chart of FIG. 5 includes an iterative process in which each iteration is steps 510-550.

Step 510 monitors computer devices for performance of computer tasks and associated metadata.

Step 520 detects a computer task from the monitoring of computer devices in step 510.

Step 530 determines whether the detected computer task is eligible to be stored in the task database 210. If so (Yes branch from step 530), step 540 is next executed. If not (No branch from step 530), step 550 is next executed.

In one embodiment, the detected task is eligible, irrespective of the metadata, if the operation of the computer task is on a list of eligible operations. In this embodiment, the task library 210 is limited to including only computer tasks having an operation that is on the list of eligible operations.

In one embodiment, the detected task is eligible, if the operation of the detected task is on the list of eligible tasks and the metadata satisfies one or more specified constraints on the metadata (e.g., a constraint of a metadata item having a specified value).

Step 540 stores the computer task and associated metadata in the task library 210.

Step 550 determines whether the current iteration is a last iteration. If so (Yes branch from step 550), the method ends. If not (No branch from step 550), the method branches back to step 510 to perform the next iteration of the iterative process.

In one embodiment, step 550 determines that the current iteration is the last iteration because a specified total number of iterations have been performed.

Alternatively in one embodiment, step 510 receives the computer tasks and associated metadata from a data source such as, inter alia, a source that monitors the computer devices or from a database that stores the performed computer tasks. In this one embodiment, step 520 is not performed.

In one embodiment, step 530 is not performed and accordingly, all detected or received computer tasks are eligible to be stored in the task database 210.

FIG. 6 is a flowchart of a process for generating the pattern library 220 of FIG. 2, in accordance with embodiments of the present invention.

Step 610 loads the computer tasks from the task library int computer memory.

Step 620 organizes the loaded computer tasks into G groups (G≥2). Each group consists of tasks having a same meta-command. Each group defines a candidate pattern characterized by the same meta-command.

Step 630 sets a group index g to zero.

Steps 640-680 constitute each iteration of an iterative process over the G groups.

Step 640 increment g by 1.

Step 650 determines a pattern score for the candidate pattern of group g.

Step 660 determines whether the pattern score exceeds the specified pattern score threshold. If so then step 670 is next executed. If not, then step 680 is next executed.

Step 670 stores the candidate pattern, along with the patten score, as a pattern in the pattern library 220.

Step 680 determines whether g=G. If so, then the process of FIG. 6 ends. If not, then the processing branches back to step 640 to perform the next iteration of the iterative process.

FIG. 7 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 8 depicts a computing environment 100 which contains an example of an environment for the execution of at least some of the computer code involved in performing the inventive methods, in accordance with embodiments of the present invention. Such computer code includes new code for preventing erroneous performance of computer tasks 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for preventing erroneous performance of computer tasks, said computer-implemented method comprising:

performing, in real time by one or more processors of a computer system, an iterative process of at least two iterations, each iteration of the iterative process comprising:

monitoring computer tasks performed on one or more computing devices used by one or more respective users, wherein each computer task, of the monitored computer tasks, comprises a command and metadata, the command being an operation and at least one operand of the operation;

ascertaining, from said monitoring, whether a deviant computer task, of the monitored computer tasks, is to be performed by a computing device of the one or more computing devices, wherein the deviant computer task has a deviation from one pattern of multiple patterns in a pattern library, wherein each pattern, of the multiple patterns, in the pattern library has a pattern score exceeding a specified pattern score threshold, and each pattern, of the multiple patterns, is a pattern of the computer tasks in a task library having a same meta-command consisting of the command and a subset of the metadata;

based on said ascertaining having ascertained that the deviant computer task is to be performed by the computing device, of the one or more computing devices, used by a respective user, of the one or more respective users:

sending an alert identifying the deviation to the computing device;

receiving, from the computing device, feedback to the alert;

updating the pattern score of the one pattern based on the feedback; and replacing the pattern score of the one pattern in the pattern library with the updated pattern score;

determining whether a last iteration of the iterative process has been performed;

terminating the iterative process based on the last iteration of the iterative process having been performed; and executing said monitoring to perform a next iteration of the iterative process based on the last iteration of the iterative process having not been performed, wherein said ascertaining ascertains, in one iteration that is not the last iteration, that the deviant computer task is to be performed.

2. The computer-implemented method of claim 1, wherein said receiving the feedback in the one iteration comprises receiving the feedback that the computing device will perform the deviant computer task or that the computing device will perform a computer task, of the computer tasks, associated with the one pattern.

3. The computer-implemented method of claim 2, wherein said receiving the feedback in the one iteration comprises receiving the feedback that the computing device will perform the computer task associated with the one pattern, the computer task associated with the one pattern is added to the one pattern in the pattern library, the updating of the pattern score comprises recomputing the pattern score of the one pattern, and said recomputing of the pattern score is based on the one pattern comprising the added computer task.

4. The computer-implemented method of claim 2, wherein said receiving the feedback in the one iteration comprises receiving the feedback that the computing device will perform the deviant computer task, and said updating the pattern score comprises decrementing the pattern score of the one pattern by a decrement value or a decrement percent.

5. The computer-implemented method of claim 4, wherein the computer-implemented method further comprises:

determining, by the one or more processors, that the decremented pattern score of the one pattern does not exceed the specified pattern score threshold; and deleting, by the one or more processors, the one pattern from the pattern library based on the determining that the decremented pattern score of the one pattern does not exceed the specified pattern score threshold.

6. The computer-implemented method of claim 4, wherein the decrement value or the decrement percent is specific to whether the computer task of the one pattern is an action or a communication.

7. The computer-implemented method of claim 4, wherein the operation included in the same meta-command of the one pattern has an operation value specific to the included operation, and the decrement value or the decrement percent is a linear function of the operation value or a nonlinear function of the operation value.

8. The computer-implemented method of claim 1, wherein the pattern score of each pattern in the pattern library is a ratio of a number of occurrences in the task library of the same meta-command to a number of occurrences in the task library of the computer tasks having the operation comprised by the same meta-command.

9. The computer-implemented method of claim 1, wherein the operation included in the same meta-command of the one pattern is an action or a communication.

10. The computer-implemented method of claim 1, wherein a necessary condition for a set of computer tasks, of the computer tasks, to be a pattern is that a total number of computer tasks in the set of computer tasks is equal to or greater than a specified minimum number of computer tasks threshold.

11. The computer-implemented method of claim 1, wherein the task library is limited to including a set of computer tasks, of the computer tasks, having an operation that is on a list of eligible operations.

12. The computer-implemented method of claim 1, wherein the alert is selected from the group consisting of a visual alert, an audio alert, and a spatial alert.

13. A computer program product, comprising one or more computer readable hardware storage devices having computer readable program code stored therein, said program code containing instructions executable by one or more processors of a computer system to implement a method for preventing erroneous performance of computer tasks, said method comprising:

performing, in real time by the one or more processors, an iterative process of at least two iterations, each iteration of the iterative process comprising:

monitoring computer tasks performed on one or more computing devices used by one or more respective users, wherein each computer task, of the monitored computer tasks, comprises a command and metadata, the command being an operation and at least one operand of the operation;

ascertaining, from said monitoring, whether a deviant computer task, of the monitored computer tasks, is to be performed by a computing device of the one or more computing devices, wherein the deviant computer task has a deviation from one pattern of multiple patterns in a pattern library, wherein each pattern, of the multiple patterns, in the pattern library has a pattern score exceeding a specified pattern score threshold, and each pattern, of the multiple patterns, is a pattern of the computer tasks in a task library having a same meta-command consisting of the command and a subset of the metadata;

based on said ascertaining having ascertained that the deviant computer task is to be performed by the computing device, of the one or more computing devices, used by a respective user, of the one or more respective users:

sending an alert identifying the deviation to the computing device;

receiving, from the computing device, feedback to the alert;

updating the pattern score of the one pattern based on the feedback; and replacing the pattern score of the one pattern in the pattern library with the updated pattern score;

determining whether a last iteration of the iterative process has been performed;

terminating the iterative process based on the last iteration of the iterative process having been performed; and executing said monitoring to perform a next iteration of the iterative process based on the last iteration of the iterative process having not been performed, wherein said ascertaining ascertains, in one iteration that is not the last iteration, that the deviant computer task is to be performed.

14. The computer program product of claim 13, wherein said receiving the feedback in the one iteration comprises receiving the feedback that the computing device will perform the deviant computer task or that the computing device will perform a computer task, of the computer tasks, associated with the one pattern.

15. The computer program product of claim 14, wherein
    said receiving the feedback in the one iteration comprises receiving the feedback that the computing device will perform the computer task associated with the one pattern,
    the computer task associated with the one pattern is added to the one pattern in the pattern library,
    the updating of the pattern score comprises recomputing the pattern score of the one pattern, and
    said recomputing of the pattern score is based on the one pattern comprising the added computer task.

16. The computer program product of claim 14, wherein
    said receiving the feedback in the one iteration comprises receiving the feedback that the computing device will perform the deviant computer task, and
    said updating the pattern score comprises decrementing the pattern score of the one pattern by a decrement value or a decrement percent.

17. A computer system, comprising one or more processors, one or more memories, and one or more computer readable hardware storage devices, said one or more computer readable hardware storage devices containing program code executable by the one or more processors via the one or more memories to implement a method for preventing erroneous performance of computer tasks, said method comprising:

performing, in real time by the one or more processors, an iterative process of at least two iterations, each iteration of the iterative process comprising:

monitoring computer tasks performed on one or more computing devices used by one or more respective users, wherein each computer task, of the monitored computer tasks, comprises a command and metadata, the command being an operation and at least one operand of the operation;

ascertaining, from said monitoring, whether a deviant computer task, of the monitored computer tasks, is to be performed by a computing device of the one or more computing devices, wherein the deviant computer task has a deviation from one pattern of multiple patterns in a pattern library, wherein each pattern, of the multiple patterns, in the pattern library has a pattern score exceeding a specified pattern score threshold, and each pattern, of the multiple patterns, is a pattern of computer tasks in a task library having a same meta-command consisting of the command and a subset of the metadata;

based on said ascertaining having ascertained that the deviant computer task is to be performed by the computing device, of the one or more computing devices, used by a respective user, of the one or more respective users:

sending an alert identifying the deviation to the computing device;

receiving, from the computing device, feedback to the alert;

updating the pattern score of the one pattern based on the feedback; and replacing the pattern score of the one pattern in the pattern library with the updated pattern score;

determining whether a last iteration of the iterative process has been performed;

terminating the iterative process based on the last iteration of the iterative process having been performed; and executing said monitoring to perform a next iteration of the iterative process based on the last iteration of the iterative process having not been performed, wherein said ascertaining ascertains, in one iteration that is not the last iteration, that the deviant computer task is to be performed.

18. The computer system of claim 17, wherein said receiving the feedback in the one iteration comprises receiving the feedback that the computing device will perform the deviant computer task or that the computing device will perform a computer task, of the computer tasks, associated with the one pattern.

19. The computer system of claim 18, wherein said receiving the feedback in the one iteration comprises receiving the feedback that the computing device will perform the computer task associated with the one pattern, the computer task associated with the one pattern is added to the one pattern in the pattern library, the updating of the pattern score comprises recomputing the pattern score of the one pattern, and said recomputing of the pattern score is based on the one pattern comprising the added computer task.

20. The computer system of claim 18, wherein said receiving the feedback in the one iteration comprises receiving the feedback that the computing device will perform the deviant computer task, and said updating the pattern score comprises decrementing the pattern score of the one pattern by a decrement value or a decrement percent.

\*  \*  \*  \*  \*